May 16, 1967     J. L. ANECKI     3,319,681
SLICING MACHINE HAVING MEANS FOR VARYING CARRIAGE STROKE
Filed May 26, 1964     3 Sheets-Sheet 1

United States Patent Office 3,319,681
Patented May 16, 1967

3,319,681
SLICING MACHINE HAVING MEANS FOR VARYING CARRIAGE STROKE
Jozef Longin Anecki, Taplow, Buckinghamshire, England, assignor to Lan-Elec Limited, Buckinghamshire, England, a British company
Filed May 26, 1964, Ser. No. 370,286
3 Claims. (Cl. 146—102)

This invention relates to automatic food slicing machines, i.e., those in which the food hopper carriage is connected, through a more or less complex mechanical linkage, with the motor so that when the motor is operated the hopper carriage is caused to reciprocate adjacent to a rotating cutter blade.

It is desirable that the stroke of the hopper carriage be commensurate with the dimensions of the body of the food to be sliced. When, however, the driven of the motor takes the form of a reciprocation of constant amplitude, a problem is created in converting this drive into a hopper carriage stroke of alterable amplitude.

It is an object of the invention to overcome this problem by applying the reciprocating drive to a point in a pivoted arm which is connected to the food hopper carriage of the machine, the arm pivot being movable along the arm and attached to a lever which can be located in any one of a number of settings, each providing different positions for the arm pivot and thereby defining the amplitude of the stroke communicated by the arm from the hopper carriage.

In the preferred construction the lever is cranked, one arm of the lever carrying the arm pivot. Alteration of the angular position of the lever then results in movement of the arm pivot along the arm into a different position, the amplitude of the drive communicated by the arm being thus altered.

Figure 1:
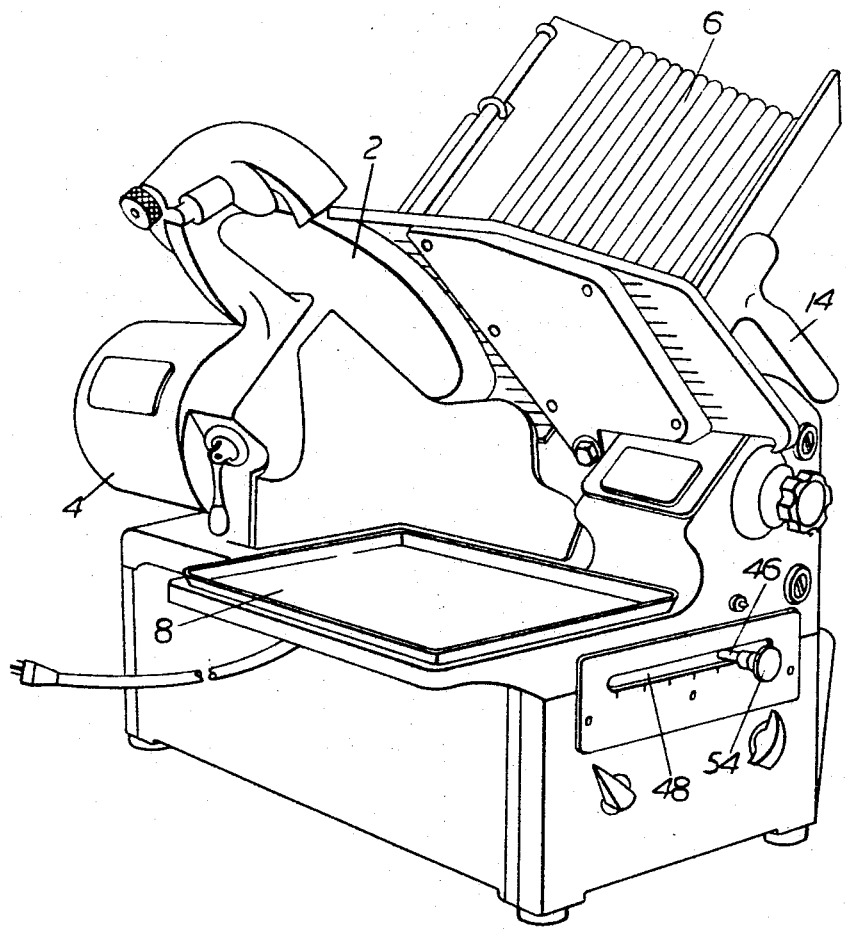
Figure 2:
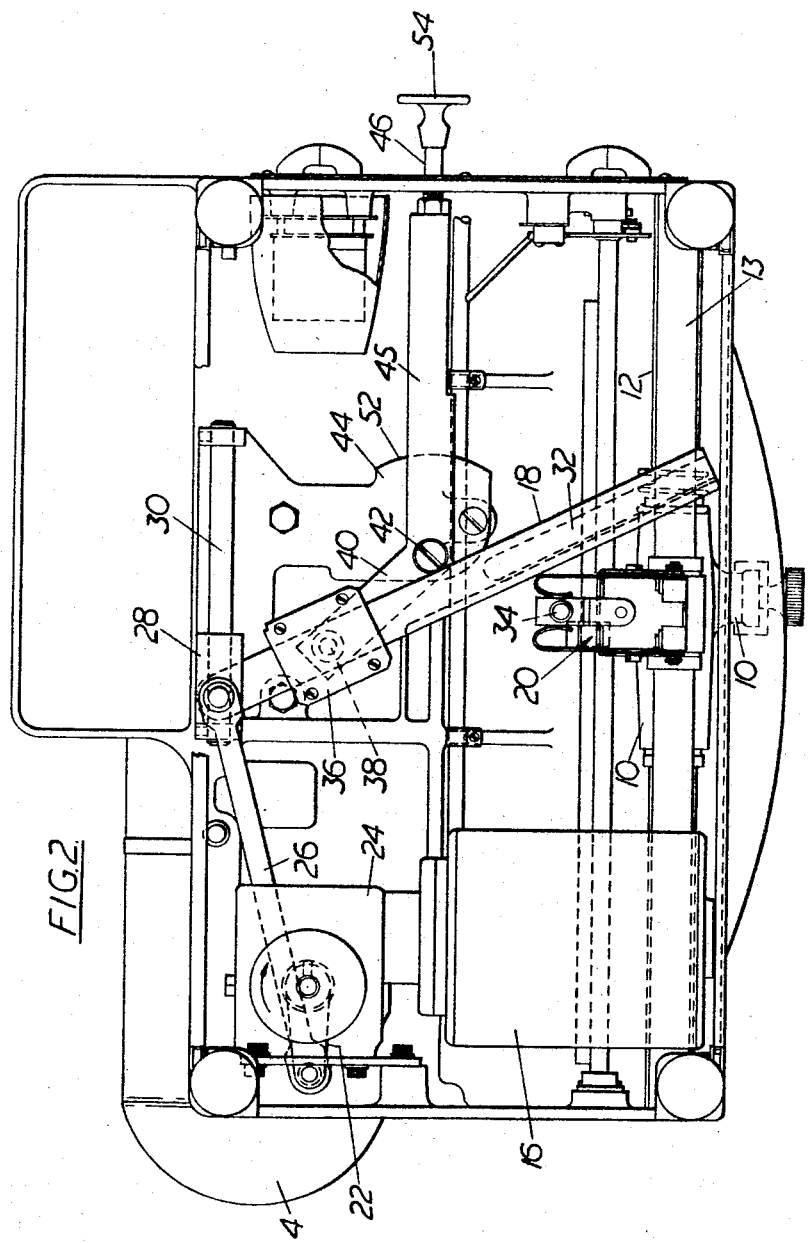
Figure 3:
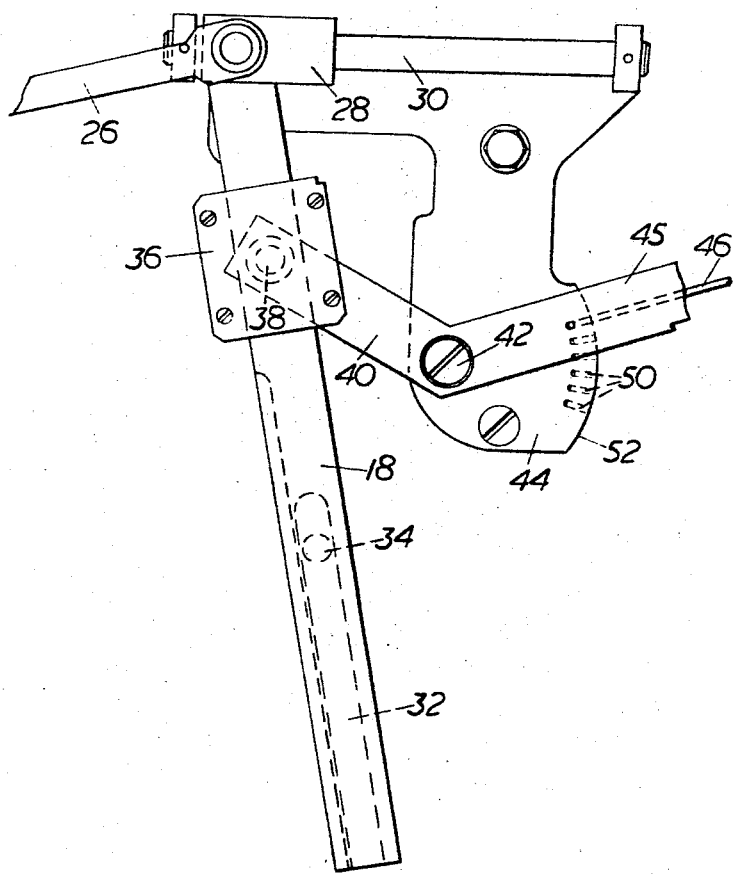

An embodiment of an automatic food slicing machine in accordance with the invention will now be described by way of example with reference to the accompanying drawings, in which:

FIGURE 1 is a perspective view of the food slicing machine;
FIGURE 2 is a bottom plan view of the machine; and
FIGURE 3 is a detail view of the stroke adjustment mechanism shown in FIGURE 2.

The food slicing machine shown in the drawings comprises essentially a rotatable cutter blade 2 which is driven by a motor 4. Food to be sliced is carried in a hopper 6 which is arranged to be reciprocated across the rotating blade 2 so that slices of the food are cut from food body held in the hopper. The slices fall onto a removable tray 8.

The hopper 6 is carried by a carriage 10 (FIG. 2) which is mounted for reciprocation on rods 12, 13 within the casing of the machine.

When the machine is set for manual operation the hopper reciprocation can be effected by means of a handle 14 secured to the hoper. When the machine is set for automatic operation the hopper carriage is reciprocated by means of a motor 16 through a grooved pivoted arm 18 and a pickup device generally indicated at 20.

The motor 16 when running, rotates a crank arm 22 (FIG. 2) through gears contained in a gear box 24. The crank arm 22 is pivotally connected to one end of the arm 18 through a connecting lever 26, the pivotal connection between the lever 26 and the arm 18 being made at a slide block or sleeve 28 which reciprocates upon a fixed rod 30.

The other end of the arm 18 is formed with a groove 32 in which is located during automatic operation a pickup peg 34 of the device 20. (The operation and construction of the pickup device forms the subject of my co-pending U.S. Patent application Ser. No. 370,287, filed May 26, 1964.)

A collar 36 is slidably mounted on the arm 18 between the sleeve 28 and the groove 32, and carries a pivot pin 38 about which the arm 18 pivots. The collar 36 is rotatably attached to one arm 40 of a bell-crank lever which is pivoted at 42 in a plate 44 fixed to the machine frame. The angular position of the arm 40 defines the position of the collar 36 on the arm 18 and therefore the amplitude of swing imparted to the grooved part 32 of the arm and hence the amplitude of the reciprocation of the peg 34 and hopper carriage upon a fixed reciprocation of the sleeve 28 on the shaft 30.

The other arm 45 of the bell-crank lever carries a spring-loaded catch pin 46 which passes through a slot 48 in the machine casing and which is urged by its spring to seat in one of a series of recesses 50 (FIG. 3) in the arcuate end face 52 of the plate 44. When the pin is so seated the bell-crank lever is locked against rotation and the position of the collar 36 on the arm 18 is thus fixed. The stroke of the hopper carriage of the machine may be changed by withdrawing the pin 46 from a recess 50 in which it is seated by means of the handle 54 which is provided on the outer end of the pin 46 and swinging the bell-crank lever to align the pin 46 with a different recess 50 thereby to set the collar 36 on the arm 18 in a different position.

The arcuate stroke traversed by the arm 40 between the extreme settings of the bell-crank lever may be calibrated along the slot 48, in terms of the amplitude of stroke imparted by the arm 18 to the hopper. The stroke of the machine can therefore be set in advance, upon inspection, or even during operation.

I claim:
1. An automatic food slicing machine comprising a rotatable blade, a motor driving said blade, a hopper adapted to receive food and mounted for reciprocation past said blade, a motor to drive said hopper past said blade, link mechanism operated by said hopper motor and forming a reciprocating drive for said hopper, said link mechanism comprising a sleeve, an arm pivoted between its ends upon said sleeve, said sleeve being movable along the arm, the portion of the arm on one side of of the pivot being connected to said hopper motor and reciprocal through a fixed amplitude by said hopper motor and the portion on the other side of the pivot being connected to the food hopper to reciprocate said hopper through an amplitude depending upon the position of the pivot.

2. An automatic food slicing machine as claimed in claim 1 in which the pivot for the arm is carried by a pivoted lever, angular movement of said lever altering the position of the sleeve and arm pivot along the length of the arm whereby the relative lengths of the two portions thereof are adjustable.

3. An automatic food slicing machine comprising a rotatable blade, a motor driving said blade, a hopper adapted to receive food and mounted for reciprocation past said blade, a motor to drive said hopper past said cutter blade, link mechanism operated by said hopper motor and forming a reciprocating drive for said hopper, said link mechanism comprising a sleeve, an arm slidable between its ends upon said sleeve, said sleeve being movable along the arm, the portion of the arm on one side of the pivot being connected to said hopper motor and reciprocal through a fixed amplitude by said hopper motor and the portion on the other side of the pivot being connected to the food hopper to reciprocate said hopper through an amplitude depending upon the position of the pivot, the pivot for the arm being carried by said sleeve which is slidable on said arm, said sleeve being carried by a pivoted lever which is angularly movable to any one of a number of angular positions, locking means for said pivoted lever to hold said lever in any one of said positions, the angular movement of said lever being effective to alter the position of the sleeve and hence the arm pivot along the length of the arm so that the relative lengths of the two portions thereof are adjustable.

References Cited by the Examiner

UNITED STATES PATENTS

| | | |
|---|---|---|
| 1,267,158 | 1/1918 | Zimmermann. |
| 1,716,158 | 6/1929 | Van Berkel. |
| 1,941,519 | 1/1934 | Van Berkel _____ 146—102 X |
| 2,431,391 | 11/1947 | Folk. |

WILLIAM W. DYER, JR., *Primary Examiner.*

W. GRAYDON ABERCROMBIE, *Examiner.*